United States Patent [19]
Kucharczyk et al.

[11] Patent Number: 5,897,165
[45] Date of Patent: Apr. 27, 1999

[54] ADAPTABLE CHILD SEAT

[75] Inventors: Sally J. Kucharczyk, Shelby Township; Susan E. Brockmann, Romeo, both of Mich.

[73] Assignee: BHMS Corporation, Washington, Mich.

[21] Appl. No.: 08/671,949

[22] Filed: Jun. 28, 1996

[51] Int. Cl.[6] .................................................. A47D 13/08
[52] U.S. Cl. .................... 297/256.17; 297/219.12
[58] Field of Search .......................... 297/219.12, 229, 297/256.17, 485

[56] References Cited

U.S. PATENT DOCUMENTS

| | | | |
|---|---|---|---|
| 4,324,430 | 4/1982 | Dimas, Jr. et al. . | |
| 4,568,125 | 2/1986 | Sckolnik . | |
| 4,655,502 | 4/1987 | Houllis . | |
| 4,666,207 | 5/1987 | Quartano | 297/219.12 |
| 4,805,937 | 2/1989 | Boucher et al. | 297/219.12 X |
| 4,867,464 | 9/1989 | Cook . | |
| 5,056,869 | 10/1991 | Morrison | 297/485 |
| 5,226,698 | 7/1993 | Harrison | 297/467 X |
| 5,238,293 | 8/1993 | Gibson . | |
| 5,330,250 | 7/1994 | Reyes . | |
| 5,354,121 | 10/1994 | Allum . | |
| 5,468,020 | 11/1995 | Scime | 297/219.12 X |
| 5,547,250 | 8/1996 | Childers | 297/256.17 |

*Primary Examiner*—Peter R. Brown

[57] ABSTRACT

An adaptable child seat for use in a cart having a child seating area. The child seat includes a seat-back portion having at least one fastener pair on the lower surface thereof for securing the seat-back portion about a horizontal member of the back section of the seating area. Each fastener pair has first and second cooperating strips extending substantially lengthwise along the seat-back portion, and the first and second strips have lengths sufficient to adapt to the height of the back section. The child seat also includes a restraint attached to the seat-back portion and a belt adapted to cooperate with the restraint for restricting forward and lateral movement of a child placed in the seating area. The length of the seat-back portion is sufficient to adapt to the height of the back section of the seating area.

19 Claims, 1 Drawing Sheet

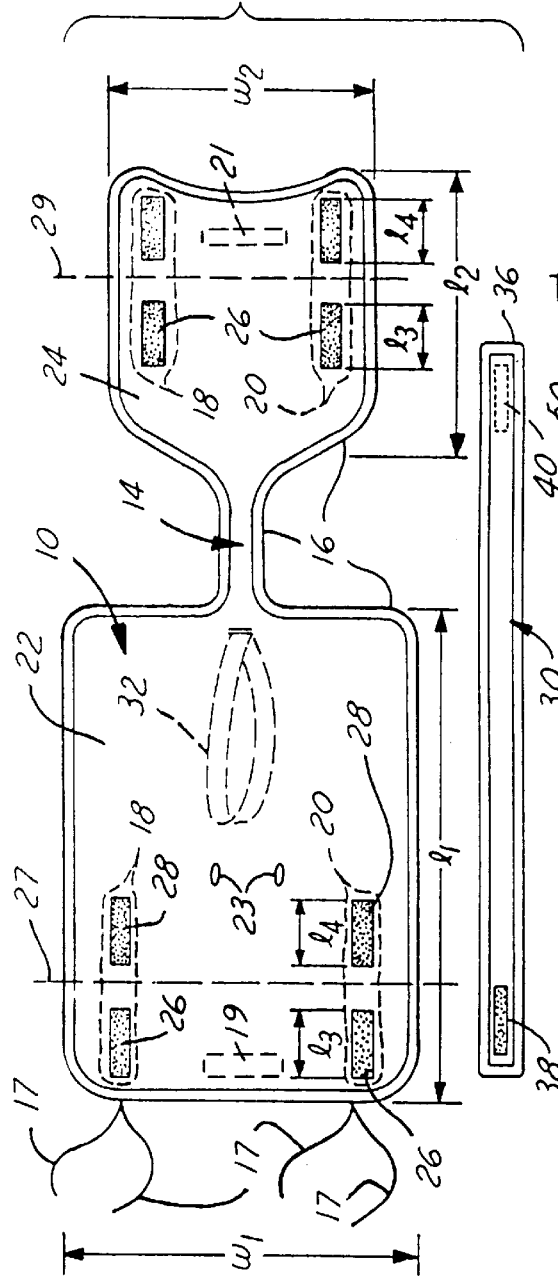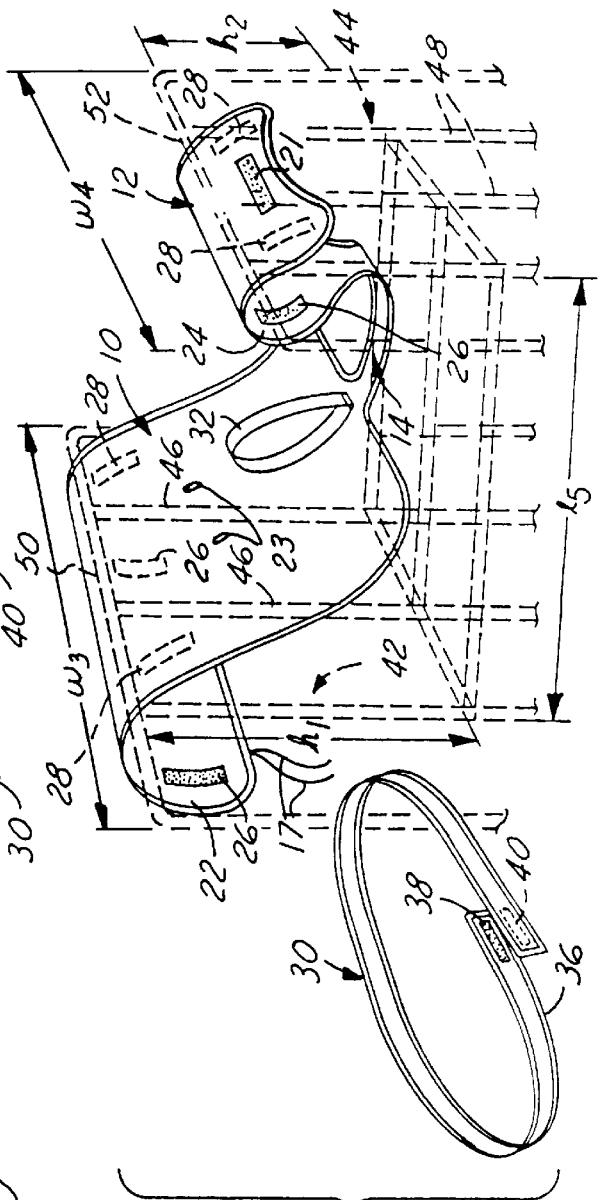

ADAPTABLE CHILD SEAT

TECHNICAL FIELD

This invention relates to an adaptable child seat for use in wheeled carts having child seating areas therein.

BACKGROUND ART

A number of different types of shopping carts are available for customer use at various retail businesses including grocery stores, home improvement warehouses and others. Such carts are wheeled and are typically made from a number of spaced apart substantially vertical and horizontal metallic bars welded together at points of intersection in a basket or grill-like construction.

For convenience, most such carts also include an area in which young children, such as infants or toddlers, may be seated. Such seating areas generally include front and back sections, each having a number of substantially vertical bars whose upper ends are connected to at least one horizontal bar running the width of the seating area. The substantially vertical bars of the front sections of such seating areas are spaced apart sufficiently to provide leg openings.

The metallic material of the bars of such seating areas may be coated or supplemented with a hard plastic material. The metallic material of the substantially vertical bars of the back sections of such seating areas, against which a child may recline, may also be covered by a rigid plastic sheet. A restraining belt may also be provided.

As a result of their construction, however, such seating areas are typically uncomfortable, especially if a child must remain seated for any extended period of time. Moreover, even if a restraining belt is provided, the construction of such seating areas can also pose a risk for injury. More particularly, a child's face, chest, arms, legs, back, neck and/or head can be cut, bruised or otherwise injured by the metallic or hard plastic materials of such seating areas. If not regularly washed, such seating areas can also be dirty.

In light of these problems, a number of child seats have been developed for use in such seating areas in order to increase a child's comfort and safety. One such seat is disclosed in U.S. Pat. No. 4,666,207 issued to Quartano ("the Quartano '207 patent"). The child seat of the Quartano '207 patent includes cushioned chest protector and seat-back portions interconnected by a narrower groin-leg protector portion, thereby creating spaces for a child's legs. The chest protector and seat-back portions are secured to the front and back sections of the seating area, respectively, by straps that cooperate with Velcro fasteners on the upper surfaces of the chest protector and seat-back portions.

Significantly, however, the straps for securing the child seat of the Quartano '207 patent in the seating area of a cart are fastened in locations that are accessible to a child placed in the seat. This creates the possibility that a child will unfasten one or more of the straps, leaving the seat at least partially unsecured.

Moreover, when secured, the seat-back portion fails to cover the horizontal bar of the back section of the seating area. Depending upon the length of the seating area, the chest protector portion may also fail to cover the horizontal bar of the front section of the seating area. In either case, a child placed in the seating area is still subject to discomfort and possible injury, as previously described.

Still further, although the child seat of the Quartano '207 patent includes a belt for restraining a child's lateral movement, it lacks any type of restraint for preventing a child from sliding forward in the seating area. While the groin-leg protector portion of the seat would ultimately stop such movement, it would not do so until a considerable amount of such movement had already occurred. This can be a particular problem with infants that have not yet completely mastered the ability to sit upright.

Finally, the horizontally segmented construction of the seat-back and chest protector portions of the child seat of the Quartano '207 patent also creates a problem. Such construction is primarily used to prevent the movement of padding inside the seat-back and chest protector portions. However, such construction restricts the ability of the chest protector portion to be folded or wrapped about a horizontal bar of the front section of a child seating area. That is, given the length of the seating area, unless the horizontal bar coincides with a junction between horizontally segmented sections of the chest protector portion, it is difficult or impossible to fold or wrap the chest protector portion around the horizontal bar and properly cover the child seating area.

Other examples of similar child seats include those disclosed in U.S. Pat. Nos. 5,354,121 issued to Allum; 5,330,250 issued to Reyes; 5,238,293 issued to Gibson; 4,867,464 issued to Cook; 4,655,502 issued to Houllis; 4,568,125 issued to Sckolnik; and 4,324,430 issued to Dimas, Jr. et al. Each of these child seats suffer from at least some of the problems discussed above. Indeed, in many cases, such child seats suffer from additional problems including the inability to adapt to seating areas of different lengths and widths, as well as a lack of flexibility for easy storage and portability.

As a result, a need exists for an improved child seat for use in carts having child seating areas therein. Such a child seat would be adaptable so that the front and back sections of seating areas of various lengths and widths may be adequately covered and cushioned for a child's comfort and safety. Such a seat would also provide restraints to prevent both lateral and forward movement of a child in the seating area. Such a seat would also ideally be flexible for easy storage and portability.

DISCLOSURE OF INVENTION

Accordingly, it is the principle object of the present invention to provide an improved child seat for use in carts having child seating areas therein.

According to the present invention, then, an adaptable child seat is provided for use in a cart having a child seating area therein, the seating area including front and back sections each having a height. The child seat comprises a seat-back portion having a length and at least one fastener pair on a lower surface thereof for securing the seat-back portion about a horizontal member of the back section of the seating area, each of the at least one fastener pair having first and second cooperating strips extending substantially lengthwise along the seat-back portion, the first and second strips having lengths sufficient to adapt to the height of the back section of the seating area. The child seat also comprises a belt for restricting lateral movement of a child placed in the seating area, and a restraint attached to the seat-back portion for restricting forward movement of a child placed in the seating area, the restraint adapted to cooperate with the belt. The length of the seat-back portion is sufficient to adapt to the height of the back section of the seating area.

In addition to the above, the adaptable child seat of the present invention may further comprise a front portion having a length and at least one fastener pair on a lower surface thereof for securing the front portion about a horizontal member of the front section of the seating area, each of the at least one fastener pair having first and second cooperating strips extending substantially lengthwise along the front portion, the first and second strips having lengths sufficient to adapt to the height of the front section of the seating area, as well as a mid-portion for connecting the seat-back and front portions. In this embodiment, the length of the front portion is sufficient to adapt to the height of front section of the seating area.

These and other objects, features and advantages will be readily apparent upon consideration of the following detailed description in conjunction with the accompanying drawings.

BRIEF DESCRIPTION OF DRAWINGS

FIG. 1 is a bottom view of the adaptable child seat of the present invention; and FIG. 2 is a perspective view of the adaptable child seat of the present invention in the environment of a child seating area of a cart.

BEST MODE FOR CARRYING OUT THE INVENTION

With reference to the drawings, the preferred embodiment of the present invention will now be described in detail. Referring first to FIG. 1, a bottom view of the adaptable child seat of the present invention is shown. As seen therein, the child seat comprises a seat-back portion (10) having a length ($l_1$) and a width ($w_1$), a front portion (12) having a length ($l_2$) and a width ($w_2$), and a mid-portion (14) interposed between the seat-back portion (10) and front portion (12). Mid-portion (14) is narrower than the respective widths ($w_1$, $w_2$) of seat-back portion (10) and front portion (12).

Seat-back portion (10), front portion (12), and mid-portion (14) are preferably constructed from one or more water-resistant materials such as nylon, vinyl, rubber, or the like, and provided with reinforced edges (16). As a result, the adaptable child seat of the present invention is durable and easily cleaned. Seat-back portion (10), front portion (12), and mid-portion (14) are also preferably flexible so that the adaptable child seat of the present invention may be rolled or folded for easy storage and portability. In that regard, a plurality of tie-straps (17) are attached to seat-back portion (10) to secure the child seat in such a rolled or folded position. Finally, seat-back portion (10), front portion (12), and mid-portion (14) are also preferably padded for comfort and constructed as an integral piece. As a result, seat-back portion (10), either alone or in combination with front portion (12) and mid-portion (14) may also be conveniently used as a diaper changing pad.

Still referring to FIG. 1, seat-back portion (10) and front portion (12) are each provided with a plurality of fastener pairs (18, 20) on the lower surfaces (22, 24) thereof. Fastener pairs (18, 20) are preferably spaced apart from each other on the lower surfaces (22, 24) of seat-back and front portions (10, 12) across the respective widths thereof ($w_1$, $w_2$). Each fastener pair (18, 20) includes first and second cooperating strips (26, 28) extending substantially lengthwise across the lengths ($l_1$, $l_2$) of seat-back and front portions (10, 12). Fastener strips (26, 28) are preferably constructed from VELCRO or a similar hook and loop interlocking material.

As will be described in greater detail below, fastener pairs (18, 20) are for use in securing the seat-back and front portions (10, 12) in a seating area of a cart. In that regard, seat-back and front portions (10, 12) are folded along lines (27, 29), respectively, or other similar lines extending across the widths ($w_1$, $w_2$) thereof so that fastener strips (26, 28) engage to secure seat-back and front portions (10, 12) about horizontal members of back and front sections, respectively, of a child seating area. In that same regard, fastener strips (26, 28) are provided with lengths (13, 14) sufficient to properly adapt seat-back and front portions (10, 12), and hence the child seat of the present invention, to child seating areas having various lengths and including front and back sections having various heights.

Seat-back portion (10) and/or front portion (12) may also be provided on the upper sides thereof with one or more pockets (19) or fastener strips (21) (shown in phantom). When the adaptable child seat of the present invention is installed in a child seating area, as described in greater detail below, pocket (19) may be used for holding any number or type of items, including coupons, checkbooks, baby items, toys, keys, or change. Likewise, fastener strip (21) may be used to attach small toys, especially for use by a child when placed in the seating area. In that regard, fastener strip (21) is again preferably constructed from VELCRO or a similar hook and loop interlocking material.

Referring still to FIG. 1, the adaptable child seat of the present invention also comprises a belt (30) and restraint (32) (shown in phantom) for restricting lateral and forward movement, respectively, of a child placed in a seating area of a cart. Restraint (32) is attached to the upper surface of seat-back portion (10) proximate mid-portion (14) and is adapted to cooperate with belt (30). In that regard, restraint (32) preferably comprises a loop of relatively strong material through which belt (30) passes during use of the child seat, as will be described in greater detail below. Restraint (32) may also comprise a length of relatively strong material having a loop at its distal end through which belt (30) is passed.

Like seat-back portion (10), front portion (12), and mid-portion (14), belt (30) and restraint (32) are also preferably flexible and constructed from one or more water-resistant materials such as nylon or the like. Belt (30) is also preferably provided with a reinforced edge (36) and padded for comfort While the belt may be fastened during use in any known manner, cooperating fastener strips (38, 40) are preferred. Once again, such fastener strips (38, 40) are preferably constructed from VELCRO or a similar hook and loop interlocking material.

Referring next to FIG. 2, a perspective view of the adaptable child seat of the present invention is shown in the environment of a child seating area of a conventional shopping cart. As seen therein, the child seating area comprises a back section (42) having a height ($h_1$) and a width ($w_3$), and a front section (44) having a height ($h_2$) and a width ($w_4$). Back and front sections (42, 44) each include a plurality of spaced apart substantially vertical bars (46, 48), as well as at least one horizontal bar (50, 52) at the upper ends thereof. The child seating area also has a length ($l_5$). As it does not form a part of the adaptable child seat of the present invention, the child seating area of the cart and its respective sections are shown in phantom.

It should be noted that the perspective view of FIG. 2 does not show the adaptable child seat of the present invention as it appears when finally installed in the child seating area. Rather, for ease of illustration only, FIG. 2 shows the adaptable child seat of the present invention in an exploded-like fashion as it might appear during installation in the child seating area. It should also be noted that the adaptable child seat of the present invention may also be used in environments other than that of a child seating area of a conventional shopping cart. Such environments could include, but would not be limited to, strollers, high chairs, theater seats, and other similar devices.

Using tie straps (17), the adaptable child seat of the present invention can also be used in the storage area of a shopping cart or in a conventional chair, such as those having spindle backs. In either case, tie straps (17) are used to secure seat-back portion (10) to a grill-like wall of the shopping cart, or to the spindle back of the chair.

As seen in FIG. 2, seat-back portion (10) is folded or wrapped over horizontal bar (50) of back section (42) in such a fashion that cooperating fastener strips (26, 28) on the lower surface (22) of seat-back portion (10) engage in the spaces between the plurality of substantially vertical bars (46) of back section (42). As previously mentioned, referring now to FIGS. 1 and 2, seat-back portion (10) may be folded about line (27), or any other similar line extending across the width ($w_1$) of seat-back portion (10). In that regard, fastener strips (26, 28) are provided with sufficient lengths (13, 14) that they may be engaged regardless of the line along which seat-back portion (10) is folded during installation in a child seating area.

Similarly, seat-back portion (10) is provided with sufficient length ($l_1$) that it may be secured about horizontal bar (50) and still cover both the height ($h_1$) of back section (42) and the length ($l_5$) of the child seating area, where a child both sits and reclines. Seat-back portion (10) is also provided with sufficient width ($w_1$) to adequately comfort and protect a child placed in the seating area. Moreover, since seat-back portion (10) is not wrapped or folded about any substantially vertical bars (46) of back section (42), the child seat of the present invention is adaptable to the back section (42) of any child seating area, regardless of its width ($w_3$).

As also seen in FIG. 2, front portion (12) is folded or wrapped over horizontal bar (52) of front section (44) in such a fashion that cooperating fastener strips (26, 28) on the lower surface (24) of front portion (10) engage in the spaces between the plurality of substantially vertical bars (48) of front section (44). As previously mentioned, referring again to FIGS. 1 and 2, front portion (12) may be folded about line (29), or any other similar line extending across the width ($w_2$) of front portion (12) In that regard, fastener strips (26, 28) are provided with sufficient lengths ($l_3$, $l_4$) that they may be engaged regardless of the line along which front portion (12) is folded during installation in a child seating area.

Similarly, front portion (12) is provided with sufficient length ($l_2$) that it may be secured about horizontal bar (52) and still adequately cover the height ($h_2$) of front section (44), which a child faces when seated. Front portion (12) is also provided with sufficient width ($w_2$) to adequately comfort and protect a child placed in the seating area. Moreover, since front portion (12) is not wrapped or folded about any substantially vertical bars (48) of front section (44), the child seat of the present invention is adaptable to the front section (44) of any child seating area, regardless of its width ($w_4$).

It should be noted that the surfaces of seat-back and front portions (10, 12) are preferably continuous or smooth in nature, as opposed to the segmented construction of many prior art child seats previously discussed. In that regard, as used herein, the continuous or smooth nature of the seat-back and front portions (10, 12) of the child seat of the present invention is defined as non-segmented construction, particularly (but not exclusively) in a direction across the width ($w_1$, $w_2$) of the seat-back and front portions (10, 12) (i.e., horizontally when the child seat is installed in the seating area)

The above described features permit the child seat of the present invention to be adapted to any child seating area, regardless of the heights ($h_1$, $h_2$) or widths ($w_3$, $w_4$) of either the front or back sections (42, 44) of that seating area. Similarly, such features also permit the child seat of the present invention to be adapted to a child seating area having any overall length ($l_5$).

It should also be noted that, when the child seat of the present invention is installed, mid-portion (14) also covers a portion of the height ($h_2$) of front section (44). As previously discussed, mid-portion (14) is narrower than seat-back and front portions (10, 12) and therefore covers those vertical bars (48) in the middle area of front section (44). In such a fashion, however, leg spaces are provided for a child placed in the seating area that match the leg spaces of the child seating area itself, previously discussed.

Once installed, a child is placed in the child seat on seat-back portion (10) with restraint (32) extending between the child's legs. Belt (30) is then wrapped around the child's chest and one or more of the plurality of vertical bars (46) of back section (42). Belt (30) is also passed through the loop of restraint (32) and secured via cooperating fastener strips (38, 40). In such a fashion, belt (30) and restraint (32) cooperate to restrict both lateral and forward movement of a child placed in the child seating area.

In that regard, belt (30) is preferably a separate piece from seat-back portion (10), front portion (12), and mid-portion (14) which, as previously discussed, are preferably of integral construction. However, belt (30) may also be permanently attached to, or an integral part of seat-back portion (10). Moreover, seat-back portion (10) may also be provided with a pair of slits or other suitable openings therein (23) through which belt (30) may be passed in addition to, or instead of one or more of the plurality of vertical bars (46) of back section (42). In such a fashion, belt (30) is then attachable to and detachable from seat-back portion (10), and further restricts lateral and forward movement of a child placed in the seating area.

As is readily apparent from the foregoing description, then, the present invention provides an improved child seat for use in carts having child seating areas therein. More specifically, the present invention provides a child seat that is adaptable to front and back sections of seating areas of various lengths and widths so that such sections are adequately covered and cushioned for a child's comfort and safety. The present invention further provides a child seat that restrain both lateral and forward movement of a child in the seating area. Still further, the present invention also provide a child seat that is flexible for easy storage and portability.

While the adaptable child seat of the present invention has been described herein for use in conjunction with a shopping cart, it may be used in any type of device having a child seating area similar to those provided in shopping carts, such as strollers, high chairs, theater seats, chairs and other similar devices. Thus, it is to be understood that the present invention has been described in an illustrative manner and the terminology which has been used is intended to be in the nature of words of description rather than of limitation. Those of ordinary skill in the art will recognize that many modifications and variations of the present invention are possible in light of the above teachings. Therefore, it is also to be understood that, within the scope of the following claims, the invention may be practiced otherwise than as specifically described.

We claim:

1. An adaptable child seat for use in a cart having a child seating area having front and back sections each having a height, the seat comprising:

a seat-back portion having a length and at least one fastener pair on a lower surface thereof for securing the seat-back portion about a horizontal member of the back section of the seating area, each of the at least one fastener pair having first and second cooperating strips extending substantially lengthwise along the seat-back portion, the first and second strips having lengths sufficient and the length of the seat-back portion being sufficient to adapt to the height of the back section of the seating area;

a front portion having a length and at least one fastener pair on a lower surface thereof for securing the front portion about a horizontal member of the front section of the seating area, each of the at least one fastener pair having first and second cooperating strips extending substantially length-wise along the front portion, the first and second strips having lengths sufficient and the length of the front portion being sufficient to adapt to the height of the front section of the seating area;

a mid-portion for connecting the seat-back and front portions;

a detached belt for restricting lateral movement of a child placed in the seating area; and a restraint attached to the seat-back portion for restricting forward movement of a child placed in the seating area, the restraint adapted to cooperate with the belt such that the restraint extends between the legs of a child placed in the seating area and the belt extends around the mid-section of a child placed in the seating area regardless of the height of the back and front sections of the seating area.

2. The adaptable child seat of claim 1 wherein the seat-back portion is of continuous construction to facilitate securing the seat-back portion about a horizontal member of the back section of the seating area.

3. The adaptable child seat of claim 1 wherein the at least one fastener pair comprises a plurality of fastener pairs spaced apart in a direction substantially parallel to a width of the seat-back portion.

4. The adaptable child seat of claim 2 wherein the at least one fastener pair on the lower surface of the front portion comprises a plurality of fastener pairs spaced apart in a direction substantially parallel to a width of the front portion.

5. The adaptable child seat of claim 2 wherein the mid-portion is narrower than the seat-back and front portions.

6. The adaptable child seat of claim 1 wherein the seat-back portion is cushioned.

7. The adaptable child seat of claim 1 wherein the seat-back portion comprises a water-resistant material.

8. The adaptable child seat of claim 2 wherein the seat-back portion, front portion and mid-portion are of integral construction.

9. The adaptable child seat of claim 2 wherein the seat-back and front portions are of approximately equal widths.

10. The adaptable child seat of claim 1 wherein the belt is attachable to the seat-back portion.

11. An adaptable child seat for use in a cart having a child seating area, the seating area having a length and including front and back sections each having a height, the seat comprising:

a continuous seat-back portion having a length and at least one fastener pair on a lower surface thereof for securing the seat-back portion about a horizontal member of the back section of the seating area, each of the at least one fastener pair having first and second cooperating strips extending substantially lengthwise along the seat-back portion, the first and second strips having lengths sufficient to adapt to the length of the back section of the seating area;

a continuous front portion having a length and at least one fastener pair on a lower surface thereof for securing the front portion about a horizontal member of the front section of the seating area, each of the at least one fastener pair having first and second cooperating strips extending substantially lengthwise along the front portion, the first and second strip having lengths sufficient to adapt to the height of the front section of the seating area;

a mid-portion for connecting the seat-back and front portions;

a detached belt for restricting lateral movement of a child placed in the seating area; and a restraint attached to the seat-back portion proximate the mid-portion for restricting forward movement of a child placed in the seating area, the restraint adapted to cooperate with the belt such that the restraint extends between the legs of a child placed in the seating area and the belt extends around the mid-portion of a child placed in the seating area regardless of the height of the front and back sections of the seating area;

wherein the lengths and continuous construction of the seat-back and front portions adapt the child seat to the length of the seating area.

12. The adaptable child seat of claim 11 wherein the at least one fastener pair on the lower surfaces of the seat-back and front portions each comprise a plurality of fastener pairs spaced apart in a direction substantially parallel to a width of the seat-back and front portions, respectively.

13. The adaptable child seat of claim 11 wherein the mid-portion is narrower than the seat-back and front portions.

14. The adaptable child seat of claim 11 wherein the seat-back portion, front portion, and mid-portion are cushioned.

15. The adaptable child seat of claim 11 wherein the seat-back portion, front portion, and mid-portion comprise a water-resistant material.

16. The adaptable child seat of claim 12 wherein the seat-back portion, front portion and mid-portion are of integral construction.

17. The adaptable child seat of claim 11 wherein the seat-back and front portions are of approximately equal widths.

18. The adaptable child seat of claim 11 wherein the belt is attachable to the seat-back portion.

19. The adaptable child seat of claim 11 wherein the seat-back portion, front portion, mid-portion, belt and restraint are constructed from flexible materials for easy storage.

* * * * *